(12) United States Patent
Wang et al.

(10) Patent No.: US 11,237,310 B2
(45) Date of Patent: Feb. 1, 2022

(54) DISPLAY COMPONENT AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Meili Wang, Beijing (CN); Xue Dong, Beijing (CN); Ming Zhu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 694 days.

(21) Appl. No.: 16/087,138

(22) PCT Filed: Mar. 28, 2018

(86) PCT No.: PCT/CN2018/080833
§ 371 (c)(1),
(2) Date: Sep. 21, 2018

(87) PCT Pub. No.: WO2019/037425
PCT Pub. Date: Feb. 28, 2019

(65) Prior Publication Data
US 2021/0223447 A1      Jul. 22, 2021

(30) Foreign Application Priority Data
Aug. 25, 2017   (CN) .......................... 201710743252.7

(51) Int. Cl.
*G02B 5/28* (2006.01)
*G02B 5/20* (2006.01)
(Continued)

(52) U.S. Cl.
CPC ............... *G02B 5/28* (2013.01); *G02B 5/207* (2013.01); *B82Y 20/00* (2013.01); *G02B 2207/101* (2013.01); *H04N 9/12* (2013.01)

(58) Field of Classification Search
CPC .... G02B 5/28; G02B 5/207; G02B 2207/101; H04N 9/12; B82Y 20/00
See application file for complete search history.

(56) References Cited

U.S. PATENT DOCUMENTS

2008/0259459 A1* 10/2008 Wang ........................ G02B 5/26
359/588
2015/0117052 A1*  4/2015 Hsu ............................ F21K 9/64
362/606

OTHER PUBLICATIONS

International Search Report and Written Opinion dated Jul. 4, 2018 in PCT/CN2018/080833.

* cited by examiner

*Primary Examiner* — Robert E. Tallman
(74) *Attorney, Agent, or Firm* — Syncoda LLC; Feng Ma

(57) ABSTRACT

A display component includes a transflective layer, a reflective layer, and at least one sidewall. The reflective layer is arranged opposing to the transflective layer, and the at least one sidewall is arranged between the reflective layer and the transflective layer. The transflective layer, the reflective layer, and the at least one sidewall are together configured, upon an input of an incident light through the transflective layer, to output a light of a target color out through the transflective layer. One or more of the at least one sidewall comprise at least one light-conversion layer configured to emit a light of the target color upon excitement by a light of a different color shedding thereupon. The display component can be configured to output a red light, a green light, or a blue light.

18 Claims, 3 Drawing Sheets

(51) Int. Cl.
*H04N 9/12* (2006.01)
*B82Y 20/00* (2011.01)

DISPLAY COMPONENT AND DISPLAY APPARATUS

CROSS-REFERENCE TO RELATED APPLICATION

The present application claims priority to Chinese Patent Application No. CN 201710743252.7 filed on Aug. 25, 2017. The disclosures of which is hereby incorporated by reference in its entirety.

TECHNICAL FIELD

The present disclosure relates to the field of display technologies, particularly relates to a display component and a display apparatus.

BACKGROUND

In existing reflective display technologies, such as the E-ink technology, colorful particles are typically adopted in different display components to achieve color display.

For example, if a red color is to be displayed, when white lights from the environment reaches the surface of red particles in a red light display component, only a light of red color (i.e. red light) is reflected by the red particles to thereby only display the red light, whereas lights of other colors (i.e. green light and blue light) are absorbed.

Similarly, if a green color is to be displayed, when white lights from the environment reaches the surface of green particles in a green light display component, only a light of green color (i.e. green light) is reflected by the green particles to thereby only display the green light, whereas lights of other colors (i.e. red light and blue light) are absorbed.

If a blue color is to be displayed, when white lights from the environment reaches the surface of blue particles in a blue light display component, only a light of blue color (i.e. blue light) is reflected by the green particles to thereby only display the blue light, whereas lights of other colors (i.e. red light and green light) are absorbed.

As such, the light utilization efficiency for an existing reflective display technology is relatively poor.

SUMMARY

In order to address the issue associated with the existing reflective display technology, the present disclosure provides a display component and a display apparatus.

In a first aspect, a display component is provided.

The display component includes a transflective layer, a reflective layer, and at least one sidewall. The reflective layer is arranged to be opposing to the transflective layer, and the at least one sidewall is arranged between the reflective layer and the transflective layer.

The transflective layer, the reflective layer, and the at least one sidewall are together configured, upon an input of an incident light through the transflective layer, to output a light of a target color out through the transflective layer. One or more of the at least one sidewall comprise at least one light-conversion layer configured to emit a light of the target color upon excitement by a light of a different color shedding thereupon.

According to some embodiments of the display component, the at least one light-conversion layer comprises a first light-conversion material, which is configured to emit a light of the target color upon excitement of a light having a wavelength shorter than the light of the target color. Herein, the target color can be a red color, and the first light-conversion material can comprise a first quantum dot material, which is configured to emit a light of the red color upon excitement of upon excitement of at least one of a light of a green color or a light of a blue color.

According to some other embodiments of the display component, the at least one light-conversion layer comprises a second light-conversion material and a third light-conversion material. The second light-conversion material is configured to emit a light of the target color upon excitement of a light having a wavelength shorter than the light of the target color, and the third light-conversion material is configured to emit a light of the target color upon excitement of a light having a wavelength longer than the light of the target color.

Herein, the at least one light-conversion layer can consist of one single light-conversion layer comprising both the second light-conversion material and the third light-conversion material. Alternatively, the at least one light-conversion layer can comprise a first light-conversion layer comprising the second light-conversion material and a second light-conversion layer comprising the third light-conversion material.

In these embodiments of the display component as described above, the target color can be a green color, the second light-conversion material can comprise a second quantum dot material configured to emit a light of the green color upon excitement of a light of a blue color, and the third light-conversion material is configured to emit a light of the green color upon excitement of a light of a red color.

Herein, the third light-conversion material can comprise a compound doped with at least one rare earth ion, wherein the compound comprises at least one of a fluoride, an oxide, a sulfide, an oxyfluoride, or a halide. Optionally, the compound can be NaYF4, and the at least one rare earth ion can comprise Erbium and Ytterbium.

According to yet some other embodiments of the display component, the at least one light-conversion layer comprises a fourth light-conversion material, which is configured to emit a light of the target color upon excitement of a light having a wavelength longer than the light of the target color.

Herein the target color can be a blue color, and the fourth light-conversion material is configured to emit a light of the blue color upon excitement of upon excitement of at least one of a light of a red color or a light of a green color.

The fourth light-conversion material can comprise a compound doped with at least one rare earth ion, wherein the compound comprises at least one of a fluoride, an oxide, a sulfide, an oxyfluoride, or a halide. The compound can be NaYF4, and the at least one rare earth ion can comprise Erbium and Ytterbium.

In any of the embodiments of the display component as described above, each of at least one sidewall can be configured to be reflective at an inner surface thereof.

In any of the embodiments of the display component as described above, the transflective layer can comprise an anti-reflective sub-layer and a metallic absorbing sub-layer, and the metallic absorbing sub-layer is arranged over a side of the anti-reflective sub-layer proximal to the reflective layer.

In a second aspect, a display apparatus is further provided.

The display apparatus comprises at least one display component. Each display component comprises a transflective layer, a reflective layer, and at least one sidewall. The reflective layer is arranged to be opposing to the transflective layer. The at least one sidewall are arranged between the reflective layer and the transflective layer. The transflective layer, the reflective layer, and the at least one sidewall are together configured, upon an input of an incident light through the transflective layer, to output a light of a target color out through the transflective layer. One or more of the at least one sidewall comprise at least one light-conversion layer configured to emit a light of the target color upon excitement by a light of a different color shedding thereupon.

In the display apparatus, the target color can be selected from a first color, a second color, or a third color, wherein the first color, the second color and the third color are respective one of three primary colors and has a decreasing wavelength. According to some embodiments, the first color, the second color and the third color are respectively a red color, a green color, and a blue color.

The display apparatus can further include a light source, which configured to provide the incident light entering through the transflective layer of the each of the at least one display component. According to some embodiments, the incident light is a white light.

BRIEF DESCRIPTION OF DRAWINGS

In order to clearly illustrate the embodiments in the present disclosure, the accompanying drawings that need to be used in the description of the embodiments will be introduced briefly.

Apparently, the following accompanying drawings are just some embodiments of the present disclosure, for those skilled in the art, they can acquire other accompanying drawings based on structures shown in these accompanying drawings on the premise of not paying creative labor.

DETAILED DESCRIPTION

Various embodiments of the present disclosure are described below with specific examples, and other advantages and effects of the present disclosure can be easily understood by those skilled in the field of technology from the contents disclosed in this specification.

Apparently, the described embodiments are only part of embodiments in the present disclosure, rather than all of them. The present disclosure can also be implemented or applied through different specific embodiments, and various details of the specification can also be modified or changed based on different viewpoints and applications without departing from the spirit of the present disclosure.

Based on the embodiments in the present disclosure, all the other embodiments acquired by those skilled in the art on the premise of not paying creative labor are in the protection scope of the present disclosure. It should be noted that, on the premise that there is no conflict, the following embodiments and the features in the embodiments can be combined together.

In order to address the relatively poor light utilization efficiency that is associated with an existing reflective display technology, the present disclosure provides a display component and a display apparatus containing the display component.

In a first aspect, the present disclosure provides a display component.

Figure 1A:
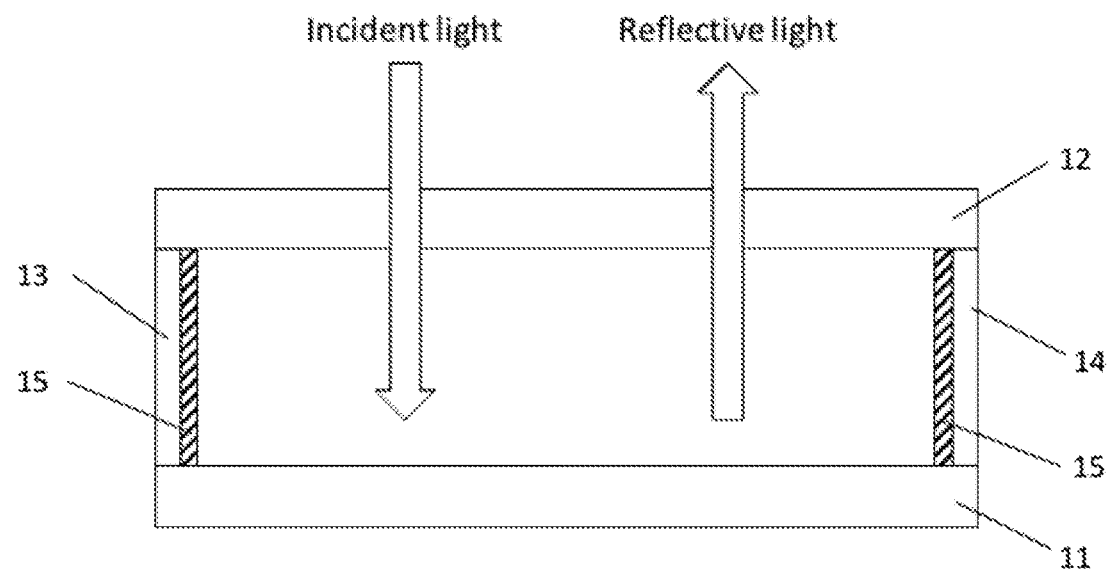
FIG. 1A illustrates the schematic diagram of a display component according to some embodiments of the disclosure.

FIG. 1A illustrates a schematic diagram of a display component according to some embodiments of the disclosure. As shown in FIG. 1A, the display component comprises a transflective layer 12, a reflective layer 11 which is opposing to the transflective layer 12, and at least one sidewall (only two sidewalls 13 and 14 are shown in FIG. 1A) that is arranged between the reflective layer 11 and the transflective layer 12.

The transflective layer 12, the reflective layer 11, and the at least one sidewall can together form a cavity. The cavity can be any shape, as long as the transflective layer and the reflective layer are respectively at two parallel opposing sides thereof. For example, the cavity can have a shape of a cylinder with the transflective layer and the reflective layer at two parallel sides of the cylinder-shaped cavity. The cavity can alternatively have a shape of a cuboid (such as in FIG. 1A and FIG. 1B), or have an irregular shape. It is noted that in the embodiment of the display component as shown in FIG. 1A, the cavity takes a shape of a cuboid, and only two opposing sidewalls 13 and 14 are shown.

As shown in FIG. 1A, the display component comprises a light-conversion layer 15, which is disposed over an inner side of one or more of the at least one sidewall (i.e. the side of a sidewall that is proximal to the cavity). The light-conversion layer 15 is configured to emit a light of a target color upon excitement by a light of a different color shedding thereupon. In other words, the light-conversion layer 15 is configured to convert an incident light (i.e. incoming light, or entering light, etc.) that is reflected by the reflective layer 11 into a light of the target color. Herein the target color may be any color, and can be, for example, a primary color such as a red color, a green color, or a blue color.

As such, in the display component as described above, the transflective layer 12, the reflective layer 11, the at least one sidewall, and the at least one light-conversion layer 15 are together configured, upon an input of an incident light through the transflective layer 12, to output a light of the target color out through the transflective layer 12.

Figure 1B:
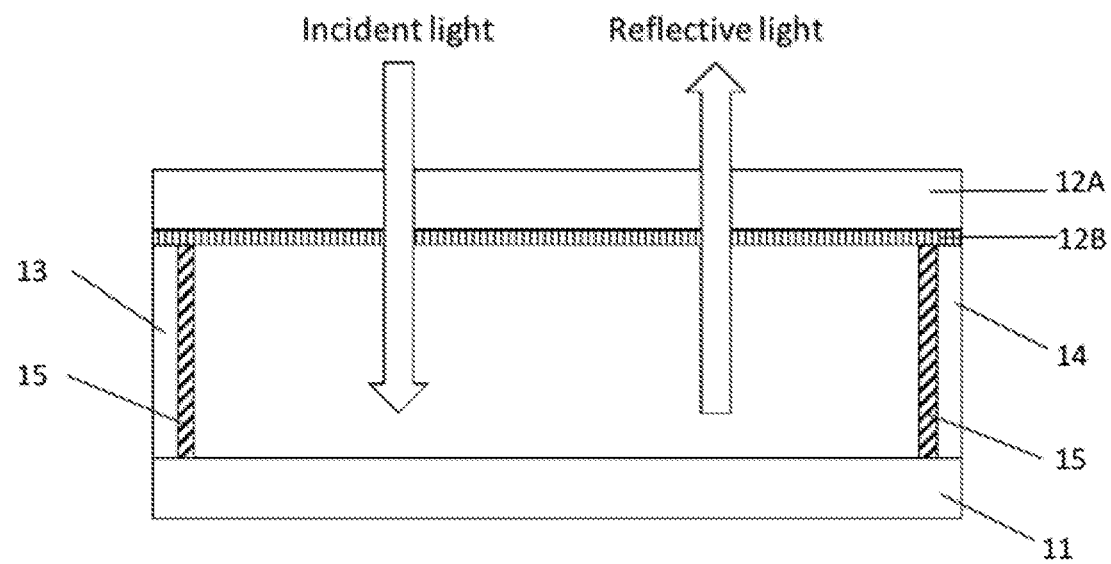
FIG. 1B illustrates the schematic diagram of a display component according to some other embodiments of the disclosure.

It is noted that according to some other embodiments of the display component as illustrated in FIG. 1B, the transflective layer 12 comprises an anti-reflective sub-layer 12A and a metallic absorbing sub-layer 12B, and the metallic absorbing sub-layer 12B is arranged over a side of the anti-reflective sub-layer 12A that is proximal to the reflective layer 11. This embodiment of the display component is configured such that after reflection by the reflective layer 11, the reflected lights having a target color (i.e. a certain wavelength) can transmit through the anti-reflective sub-layer 12A and the metallic absorbing sub-layer 12B, whereas the reflected lights having other wavelengths vibrate repeatedly inside the cavity and are absorbed by the metallic absorbing sub-layer 12B until the energy of the lights is finally dissipated. As such, these embodiments of the display component as illustrated in FIG. 1B can realize the output of a light of the target color.

It is noted that in the following, with reference to FIG. 2, FIG. 3 and FIG. 4, the three embodiments of the display component are described in detail, and that each of the three embodiments of the display component has a regular shape of a cuboid for the cavity formed by the transflective layer, the reflective layer, and the at least one sidewall. In the cross-section view, only two opposingly arranged sidewalls (i.e. a first sidewall and a second sidewall) are shown and described.

Figure 2:
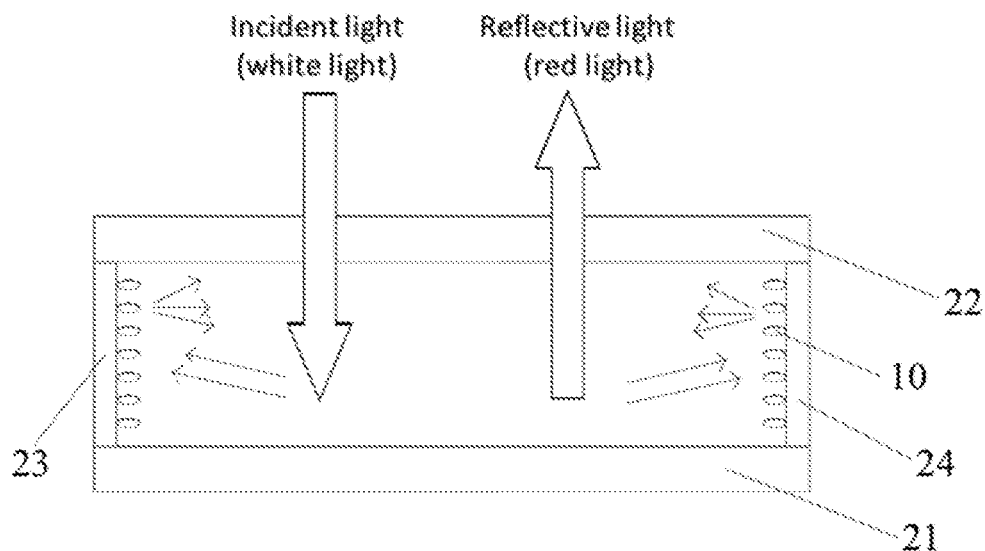
FIG. 2 is a diagram illustrating a display component configured to reflect a red light according to some embodiments of the present disclosure.
Figure 3:
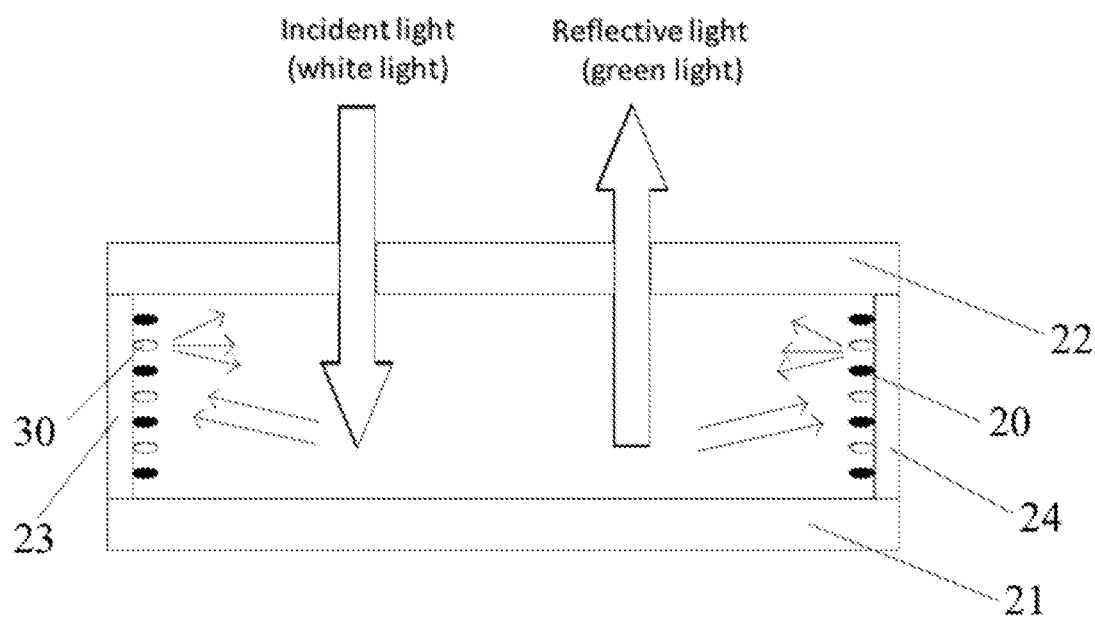
FIG. 3 is a diagram illustrating a display component configured to reflect a green light according to some embodiments of the present disclosure.
Figure 4:
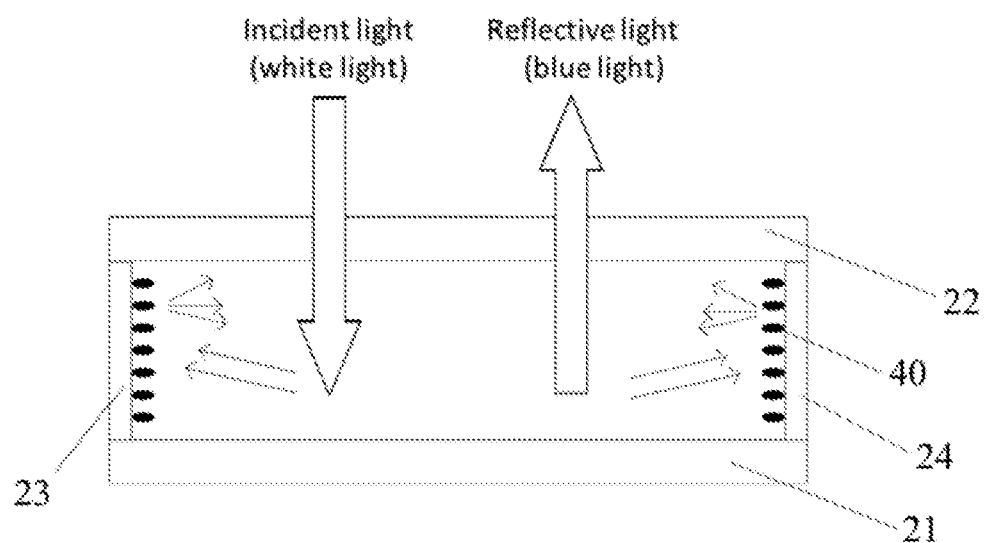
FIG. 4 is a diagram illustrating a display component configured to reflect a blue light according to some embodiments of the present disclosure.

As illustrated in each of FIG. 2, FIG. 3 and FIG. 4, each embodiment of the display component disclosed herein comprises a reflective layer 21 and a transflective layer 22. The at least one sidewall of the display component include a first sidewall 23 and a second sidewall 24 in the cross-sectional view as illustrated in each of FIGS. 2-4, which are arranged between the reflective layer 21 and the transflective layer 22. The reflective layer 21, the transflective layer 22, and the at least one sidewall together form a cavity.

Inside the cavity of the display component, at least one light-conversion layer is arranged over at least one of the first sidewall 23 or the second sidewall 24 of the display component. The at least one light-conversion layer is configured to convert an incident light (i.e. incoming light, or entering light, etc.) that is reflected by the reflective layer 21 into a light of a target color (i.e. the at least one light-conversion layer is configured to emit a light of a target color upon excitement by an incident light reflected by the reflective layer 21). The cavity is configured to ensure the light of the target color to emit through the transflective layer 22.

As such, the display component provided by the present disclosure comprises a cavity, and at least one light-conversion layer is configured over at least one of the first sidewall 23 or the second sidewall 24. The cavity is configured to only reflect an incoming light of certain wavelengths (i.e. a light of a target color), whereas an incoming light of other wavelengths is absorbed by the at least one light-conversion layer and is further converted into a light of the target color which emits out of the cavity. The light utilization rate for the display component is thereby improved.

In the following, three different types of the display component as described above, which respectively reflects a red light, a green light or a blue light, will be described in detail.

FIG. 2 illustrates a first type of the display component according to some embodiments of the disclosure, which is substantially a display component that specifically reflects a red light.

As illustrated in FIG. 2, this first type of display component comprises a cavity which is configured to reflect a red light. The at least one light-conversion layer comprising a first light-conversion material 10 that can be excited to emit a red light is configured or arranged over at least one of a first sidewall 23 or a second sidewall 24. Herein, the first light-conversion material 10 can be a first quantum dot material, or other material that is configured to emit a red light upon excitement by other lights such as a green light or a blue light.

In the following, the working principle of this first type of display component is described with embodiments where the first light-conversion material 10 is configured over both the first sidewall 23 and the second sidewall 24.

Specifically in a first embodiment of the first type of display component, the incoming light is a white light, the light of a target color is a light of a red color (i.e. red light), and the first light-conversion material 10 is a material that is configured to absorb a blue light and a green light and to emit a red light upon excitement by the blue light and the green light.

In this first embodiment of the first type of display component, the white light can be obtained from a light source that specifically emits lights of the three primary colors: red, green, and blue. The red portion of the white light (i.e. the red light) can be reflected out of the inner chamber of the cavity without being influenced by other factors. The green portion and the blue portion of the white light (i.e. the green light and the blue light respectively) can be absorbed after reaching the light-conversion material inside the inner chamber of the cavity (more specifically on the first sidewall 23 and on the second sidewall 24), and at the same time, the light-conversion material is then excited by the green light and the blue light to emit a red light, which is further reflected out of the inner chamber of the cavity.

Specifically in a second embodiment of the first type of display component, the incoming light is a green light, the light of the target color is a red light, and the first light-conversion material 10 is a material that is configured to absorb a green light and to convert the green light into a red light (i.e. to emit a red light upon excitement by the green light). In this second embodiment of the first type of display component, the green light that reaches the light-conversion material inside the inner chamber of the cavity is absorbed, and at the same time, the light-conversion material is excited by the green light to emit a red light, which is further reflected out of the inner chamber of the cavity.

Similarly in a third embodiment of the first type of display component, the incoming light is a blue light, the light of target color is a red light, and the light-conversion material is a material that is configured to absorb a blue light and to convert the blue light into a red light (i.e. to emit a red light upon excitement by the blue light). In this third embodiment of the first type of display component, the blue light is absorbed after it reaches the light-conversion material inside the inner chamber of the cavity, and at the same time, the light-conversion material is excited by the blue light to emit a red light, which is further reflected out of the inner chamber of the cavity.

In a fourth embodiment of the first type of display component, the incoming light is a mixture of a green light and a blue light, the light of target color is a red light, and the first light-conversion material 10 is a material that is configured to absorb a blue light and a green light and to emit red light upon excitement by the blue light and the green light. The green light and the blue light reach the light-conversion material inside the inner chamber of the cavity and are absorbed, and at the same time, the light-conversion material is excited to emit a red light, which is further reflected out of the inner chamber of the cavity.

FIG. 3 illustrates a second type of the display component according to some embodiments of the disclosure, which is substantially a display component that specifically reflects a green light.

As shown in FIG. 3, the second type of display component comprises a cavity which is configured to reflect a green light. At least one light-conversion layer that can be excited to emit a green light is configured over at least one of the first sidewall 23 or the second sidewall 24 inside the inner chamber of the cavity. In the following, the working principle of this second type of display component is described with embodiments where the at least one light-conversion layer is configured over both the first sidewall 23 and the second sidewall 24.

Specifically in a first embodiment of the second type of display component, the incoming light is a white light, the light of target color is a green light, and the at least one light-conversion layer comprises a second light-conversion material 20 and a third light-conversion material 30.

The second light-conversion material 20 is configured to emit a second light of a relatively longer wavelength and a relatively lower frequency after it is excited by a first light of a relatively shorter wavelength and a relatively higher frequency, and thus the second light-conversion material 20 is also called a down-conversion material. The third light-conversion material 30 is configured to emit a second light of a relatively shorter wavelength and a relatively higher frequency after it is excited by a second light of a relatively longer wavelength and a relatively lower frequency, and thus the third light-conversion material 30 is also called an up-conversion material.

Herein in this first embodiment of the second type of display component, the third light-conversion material 30 is configured to absorb a red light and emit a green light upon excitement by the red light, and the second light-conversion material 20 is configured to absorb a blue light and emit a green light upon excitement by the blue light. Herein the second light-conversion material 20 can be a second quantum dot material, or another material that can emit a green light upon excitement by other lights such as the blue light.

Further as shown in FIG. 3, the second light-conversion material 20 and the third light-conversion material 30 are arranged over each of the first sidewall 23 and the second sidewall 24 in the inner chamber of the cavity that is configured to reflect green light. The second light-conversion material 20 and the third light-conversion material 30 are arranged alternately over each of the first sidewall 23 and the second sidewall 24 (i.e., a mixed mode).

It is noted that in addition to this above mixed mode as shown in FIG. 3, alternatively the second light-conversion material 20 and the third light-conversion material 30 can be arranged over each of the first sidewall 23 and the second sidewall 24 in a layered mode, that is, a layer of the second light-conversion material 20 and a layer of the third light-conversion material 30 are stacked over one another over each of the first sidewall 23 and the second sidewall 24. The relative position of the two layers can be interchangeable (i.e. the layer of the second light-conversion material 20 be arranged at a position that is relatively closer to the first sidewall 23 or the second sidewall 24 than the layer of the third light-conversion material 30, or alternatively, the layer of the third light-conversion material 30 be arranged at a position that is relatively closer to the first sidewall 23 or the second sidewall 24 than the layer of the second light-conversion material 20).

Herein in this first embodiment of the second type of display component, the incoming light is a white light. As such, the red portion of the white light (i.e. red light) is absorbed by the third light-conversion material 30, and the third light-conversion material 30 is excited by the red light to emit a green light, which is then reflected out of the inner chamber of the cavity. The blue portion of the white light (i.e. blue light) is absorbed by the second light-conversion material 20, and the second light-conversion material 20 is excited by the blue light to emit a green light, which is then reflected out of the inner chamber of the cavity. The green portion of the white light (i.e. green light) is not influenced and is reflected directly out of the inner chamber of the cavity.

Similarly in a second embodiment of the second type of display component, the incoming light is a mixture of a red light and a blue light, the light of a target color is a green light, and the at least one light-conversion layer comprises a second light-conversion material 20 and a third light-conversion material 30. As such, the working principle of this second embodiment of the second type of display component to reflect a green light are the same as the first embodiment of the second type of display component, and thus will not be repeated herein.

In a third embodiment of the second type of display component, the incoming light is a red light, and the at least one light-conversion layer comprises a third light-conversion material 30. As such, the red light reflected by the reflective layer 21 can be absorbed by the third light-conversion material 30 inside the inner chamber of the cavity, and the third light-conversion material 30 can be excited to emit a green light, which is then reflected out of the inner chamber of the cavity.

In a fourth embodiment of the second type of display component, the incoming light is a blue light, and the at least one light-conversion layer comprises a second light-conversion material 20. As such, the blue light reflected by the reflective layer 21 can be absorbed by the second light-conversion material 20, and the second light-conversion material 20 can be excited to emit a green light, which is then reflected out of the inner chamber of the cavity.

FIG. 4 illustrates a third type of the display component according to some embodiments of the disclosure, which is substantially a display component that specifically reflects a blue light.

As shown in FIG. 4, this third type of display component comprises a cavity that is configured to reflect a blue light, and at least one light-conversion layer comprises a fourth light-conversion material 40 that can be excited to emit a blue light is configured over at least one of the first sidewall 23 or the second sidewall 24 inside the inner chamber of the cavity. In the following, the working principle of this third type of display component is described with embodiments where the light-conversion material is configured over both the first sidewall 23 and the second sidewall 24.

Specifically in a first embodiment of this third type of display component, the incoming light is a white light, the light of target color is a blue light, and the fourth light-conversion material 40 can be the third light-conversion material 30. As such, the third light-conversion material 30 can absorb the red portion and the green portion of the white light (i.e. the red light and the green light) and can be excited to emit a blue light, which is then reflected out of the cavity. The blue portion of the white light (i.e. the blue light) is not influenced, and is directly reflected out of the inner chamber of the cavity.

Similarly, in other embodiments of the third type of display component, the incoming light is a red light and/or a green light, the light of target color is a blue light. In this case, similar to the case where the incoming light is a white light, the light-conversion material is a third light-conversion material 30 which can absorb a red light and/or a green light and can be excited thereby to further emit a blue light, which is then reflected out of the inner chamber of the cavity.

Herein, the third light-conversion material 30 (i.e. up-conversion material) configured to absorb a red light and/or a green light, and to emit a blue light can comprise a compound (e.g. a fluoride, an oxide, a sulfide, an oxyfluoride, and a halide, etc.) doped with at least one rare earth ion, One example of the third light-conversion material 30 (i.e. up-conversion material) is $NaYF_4$: Er, Yb, where the compound $NaYF_4$ is doped with both Erbium and Ytterbium, and Erbium is configured as an activator, and Ytterbium is configured as a sensitizer.

In any of the three types of display component, each of the first sidewall 23 and the second sidewall 24 of the cavity can have a composition of reflective material, or can comprise an inner surface having a composition of reflective material. As such, the light of target color that is emitted from the light-conversion material can be reflected out of the cavity, effectively reducing a waste of light.

In a second aspect, the present disclosure further provides a display apparatus.

The display apparatus comprises any one or any combinations of the display components as described above. The display apparatus further comprises other conventional structures, such as a power source, a display driving circuit.

The display apparatus may be any electronics product or component that has a display function, such as a mobile phone, a tablet, a television, a monitor, a laptop, a digital frame or a navigator, etc.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display component, comprising:
a transflective layer;
a reflective layer, opposing to the transflective layer; and
at least one sidewall, arranged between the reflective layer and the transflective layer;
wherein:
the transflective layer, the reflective layer, and the at least one sidewall are together configured, upon an input of an incident light through the transflective layer, to output a light of a target color out through the transflective layer;
one or more of the at least one sidewall comprise at least one light-conversion layer configured to emit a light of the target color upon excitement by a light of a a different color shedding thereupon; and
the transflective layer comprises:
an anti-reflective sub-layer; and
a metallic absorbing sub-layer, arranged over a side of the anti-reflective sub-layer proximal to the reflective layer.

2. The display component of claim 1, wherein the at least one light-conversion layer comprises a first light-conversion material, configured to emit a light of the target color upon excitement of a light having a wavelength shorter than the light of the target color.

3. The display component of claim 2, wherein the target color is a red color, and the first light-conversion material comprises a first quantum dot material, configured to emit a light of the red color upon excitement of upon excitement of at least one of a light of a green color or a light of a blue color.

4. The display component of claim 1, wherein the at least one light-conversion layer comprises:
a second light-conversion material, configured to emit a light of the target color upon excitement of a light having a wavelength shorter than the light of the target color; and
a third light-conversion material, configured to emit a light of the target color upon excitement of a light having a wavelength longer than the light of the target color.

5. The display component of claim 4, wherein the at least one light-conversion layer consists of one single light-conversion layer comprising both the second light-conversion material and the third light-conversion material.

6. A display component, comprising:
a transflective layer;
a reflective layer, opposing to the transflective layer; and
at least one sidewall, arranged between the reflective layer and the transflective layer;
wherein:
the transflective layer, the reflective layer, and the at least one sidewall are together configured, upon an input of an incident light through the transflective layer, to output a light of a target color out through the transflective layer; and
one or more of the at least one sidewall comprise at least one light-conversion layer configured to emit a light of the target color upon excitement by a light of a different color shedding thereupon;
wherein the at least one light-conversion layer comprises:
a second light-conversion material, configured to emit a light of the target color upon excitement of a light having a wavelength shorter than the light of the target color; and
a third light-conversion material, configured to emit a light of the target color upon excitement of a light having a wavelength longer than the light of the target color; and
wherein the at least one light-conversion layer further comprises:
a first light-conversion layer comprising the second light-conversion material; and
a second light-conversion layer comprising the third light-conversion material.

7. The display component of claim 4, wherein:
the target color is a green color;
the second light-conversion material comprises a second quantum dot material, configured to emit a light of the green color upon excitement of a light of a blue color; and
the third light-conversion material is configured to emit a light of the green color upon excitement of a light of a red color.

8. The display component of claim 7, wherein the third light-conversion material comprises a compound doped with at least one rare earth ion, wherein the compound comprises at least one of a fluoride, an oxide, a sulfide, an oxyfluoride, or a halide.

9. The display component of claim 8, wherein the compound is $NaYF_4$, and the at least one rare earth ion comprises Erbium and Ytterbium.

10. The display component of claim 1, wherein the at least one light-conversion layer comprises a fourth light-conversion material, configured to emit a light of the target color upon excitement of a light having a wavelength longer than the light of the target color.

11. The display component of claim 10, wherein the target color is a blue color, and the fourth light-conversion material is configured to emit a light of the blue color upon excitement of upon excitement of at least one of a light of a red color or a light of a green color.

12. The display component of claim 11, wherein the fourth light-conversion material comprises a compound doped with at least one rare earth ion, wherein the compound comprises at least one of a fluoride, an oxide, a sulfide, an oxyfluoride, or a halide.

13. The display component of claim 12, wherein the compound is $NaYF_4$, and the at least one rare earth ion comprises Erbium and Ytterbium.

14. The display component of claim 1, wherein each of at least one sidewall is configured to be reflective at an inner surface thereof.

15. A display apparatus, comprising at least one display component, each comprising:
   a transflective layer;
   a reflective layer, opposing to the transflective layer; and
   at least one sidewall, arranged between the reflective layer and the transflective layer;
   wherein:
      the transflective layer, the reflective layer, and the at least one sidewall are together configured, upon an input of an incident light through the transflective layer, to output a light of a target color out through the transflective layer;
      one or more of the at least one sidewall comprise at least one light-conversion layer configured to emit a light of the target color upon excitement by a light of a different color shedding thereupon; and
   the display apparatus further comprises a light source, configured to provide the incident light entering through the transflective layer of the each of the at least one display component.

16. The display apparatus of claim 15, wherein the target color is selected from a first color, a second color, or a third color, wherein the first color, the second color and the third color are respective one of three primary colors and has a decreasing wavelength.

17. The display apparatus of claim 16, wherein the first color, the second color and the third color are respectively a red color, a green color, and a blue color.

18. The display apparatus of claim 15, wherein the incident light is a white light.

* * * * *